United States Patent
Mateos-Queiruga et al.

(10) Patent No.: US 8,465,563 B2
(45) Date of Patent: Jun. 18, 2013

(54) METHOD AND DEVICE FOR PRODUCING A SYNTHESIS GAS CONTAINING $H_2$ AND CO

(75) Inventors: Daniel Mateos-Queiruga, Madrid (ES); Ulrich Wolf, Egelsbach (DE)

(73) Assignee: Lurgi AG, Frankfurt, Main (DE)

( * ) Notice: Subject to any disclaimer, the term of this patent is extended or adjusted under 35 U.S.C. 154(b) by 1075 days.

(21) Appl. No.: 11/721,115

(22) PCT Filed: Dec. 1, 2005

(86) PCT No.: PCT/EP2005/012722
§ 371 (c)(1), (2), (4) Date: Oct. 27, 2009

(87) PCT Pub. No.: WO2006/061121
PCT Pub. Date: Jun. 15, 2006

(65) Prior Publication Data
US 2010/0044641 A1    Feb. 25, 2010

(30) Foreign Application Priority Data
Dec. 8, 2004   (DE) .......................... 10 2004 059 014

(51) Int. Cl.
*B01J 8/00*    (2006.01)

(52) U.S. Cl.
USPC .......... 48/127.9; 422/625; 422/626; 422/627; 422/628; 422/629

(58) Field of Classification Search
USPC ................. 422/625–629; 48/61, 127.9, 197 R
See application file for complete search history.

(56) References Cited

U.S. PATENT DOCUMENTS

| | | | | |
|---|---|---|---|---|
| 4,064,072 A * | 12/1977 | Bushick | ......................... | 502/330 |
| 4,849,187 A * | 7/1989 | Uozu et al. | ..................... | 422/629 |
| 4,976,928 A * | 12/1990 | Foster et al. | ................... | 422/148 |
| 5,079,267 A * | 1/1992 | Kao et al. | ....................... | 518/704 |
| 5,858,314 A * | 1/1999 | Hsu et al. | ....................... | 422/211 |
| 2002/0083646 A1* | 7/2002 | Deshpande et al. | ...... | 48/197 FM |

FOREIGN PATENT DOCUMENTS

EP    0 450 872 A1    10/1991

OTHER PUBLICATIONS

Häusinger P; Lohmüller R, Watson A.M.: "Hydrogen-4. Production", Ullmann's Encyclopedia of Industrial Chemistry, 'Online! Jun. 15, 2000, XP002369204.
Ullmann'S Encyclopedia of Industrial Chemistry, "Gas Production", vol. a12, 1989, p. 192, XP001246504.

\* cited by examiner

*Primary Examiner* — Paul Wartalowicz
(74) *Attorney, Agent, or Firm* — Norris McLaughlin & Marcus PA

(57) ABSTRACT

In a process for producing synthesis gas by catalytic conversion of hydrocarbons contained in a desulfurized feed gas stream with steam, the mixture of feed gas and steam is preheated by heat exchange at a pressure of 10 to 45 bar to a temperature of 300 to 700° C. and is subsequently heated by heat exchange above a catalyst at a pressure of 10 to 45 bar to a temperature of 650 to 950° C. To minimize the apparatus involved, it is provided that the mixture of feed gas and steam traverses a catalyst bed contained in a reaction tank, and the catalyst bed is heated by thermal radiation and convection.

3 Claims, 3 Drawing Sheets

METHOD AND DEVICE FOR PRODUCING A SYNTHESIS GAS CONTAINING $H_2$ AND CO

Figure 1:
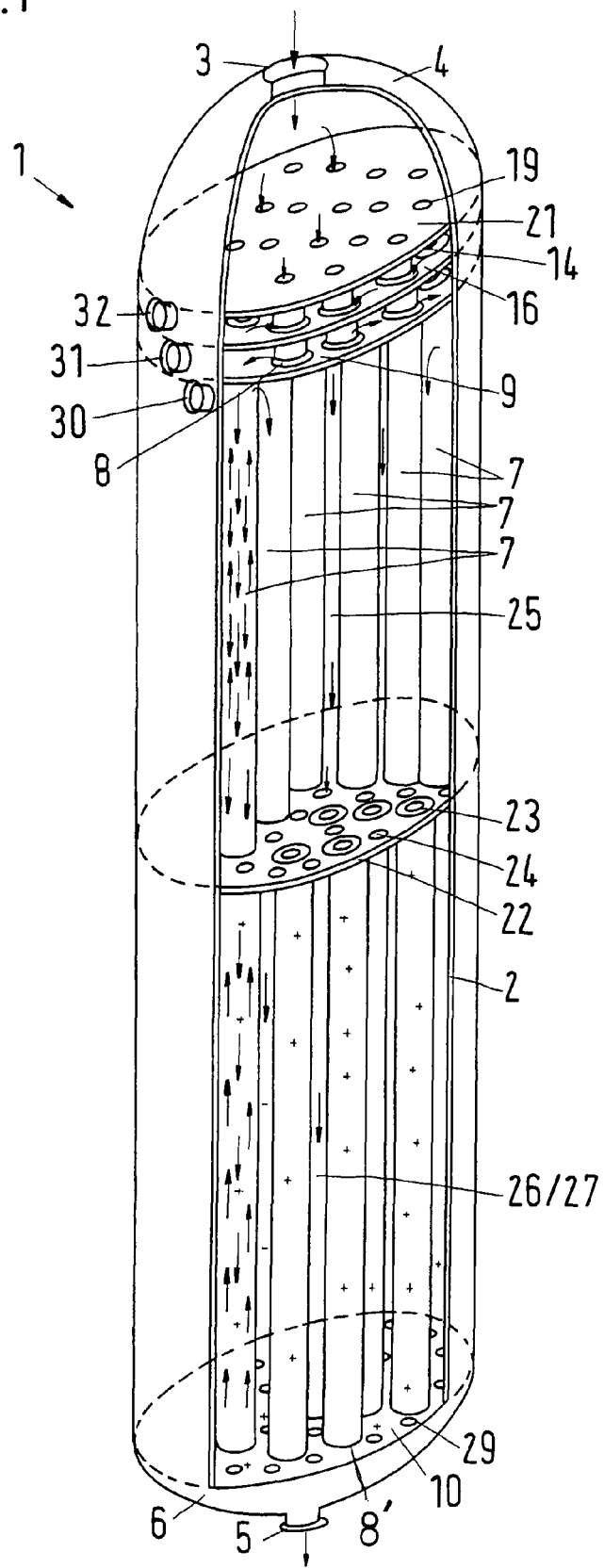

This application is a 371 application of PCT/EP2005/012722 filed Dec. 1, 2005, which claims priority to the German application DE 10 2004 059 014.1 filed Dec. 8, 2004.

This invention relates to a process and an apparatus for producing synthesis gas containing $H_2$ and CO by catalytic conversion of hydrocarbons contained in a feed gas stream with steam, in that the feed gas which is heated to 300 to 400° C. and subsequently desulfurized is mixed with steam, the mixture of feed gas and steam is preheated by heat exchange at a pressure of 10 to 45 bar to a temperature of 300 to 700° C., preferably 560 to 650° C., and subsequently is heated by heat exchange over a catalyst at a pressure of 10 to 45 bar to a temperature of 650 to 950° C.

The catalytic conversion of hydrocarbons contained in feed gas streams free from sulfur with steam for producing gas with a relatively high content of $H_2$ and CO is effected according to the following reactions taking place at the same time:

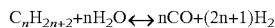
$$C_nH_{2n+2} + nH_2O \leftrightarrow nCO + (2n+1)H_2$$

$$CH_4 + H_2O \leftrightarrow CO + 3H_2$$

$$CO + H_2O \leftrightarrow CO_2 + H_2$$

and has long since been known as steam reforming. The conversion of the hydrocarbons is performed in tubes arranged vertical and in parallel, heatable from outside, filled with a nickel catalyst, and arranged in several parallel rows in a firebox, and is highly endothermal. Before steam reforming, the feed gas stream must be desulfurized, in order to prevent a poisoning of the nickel catalyst contained in the tubes. For this purpose, the feed gas stream is passed through a desulfurization reactor containing ZnO as catalyst, in which $H_2S$ is converted to ZnS and $H_2O$ at temperatures of 300 to 400° C. The feed gas stream substantially free from sulfur, which exits from the desulfurization reactor and contains a small amount of steam formed during the conversion, subsequently is mixed with steam, the gas-steam mixture is preheated to a temperature of 300 to 700° C., preferably 560 to 650° C., and subsequently heated to a temperature of 650 to 950° C. in the tubes of the tubular reactor above the nickel catalyst. The gas stream leaving the tubular reactor contains $H_2$, CO, $CO_2$, unconverted steam and $CH_4$ as well as possibly inert gas constituents of the feed gas stream. The tubes of the tubular reactor generally are heated from outside by means of burners mounted in the ceiling of the firebox. The reformed gas stream subsequently cooled to a temperature of 200 to 400° C., preferably 250 to 340° C., is passed through a reactor filled for instance with iron oxide as catalyst and thereby is converted to CO with the unconverted process steam according to the reaction

$$CO + H_2O \leftrightarrow CO_2 + H_2$$

(Ullmann's Encyclopedia of Industrial Chemistry, Vol. A12, pages 186-192; VCH Verlagsgesellschaft mbH, Weinheim 1989).

It is the object of the present invention to provide a process and an apparatus which provide for an improved production of synthesis gas containing $H_2$ and CO; in particular, the apparatus for performing the process should have a compact design and should be mountable at the construction site with a comparatively lower effort.

This object is solved in that a catalyst bed incorporated in a reaction tank is traversed by a mixture of feed gas and steam and is heated indirectly by thermal radiation and convection and in accordance with the particular aspect of the invention is indirectly preheated by thermal radiation and convection before entrance into the catalyst bed in the reaction tank.

The apparatus for performing the process consists of a vertical reaction tank, in which a tube bundle is disposed, which is formed of axially parallel, internally heatable radiant tubes closed at the bottom, a flame tube concentrically is inserted in each radiant tube by forming an annular space, and in each flame tube a gas lance concentrically is inserted by forming an annular space, and the reaction space to be traversed by the mixture of feed gas and steam is filled with a catalyst bed around the radiant tubes.

Expediently, the filling height of the catalyst bed in the reaction space is 30 to 75%, preferably 40 to 60% of the overall height of the tube bundle in the reaction space of the reaction tank.

The reaction space of the reaction tank located above the catalyst bed is the preheating zone for the mixture of feed gas and steam.

Preheating the mixture of feed gas and steam advantageously can be achieved in that in the vicinity of the reaction space located above the catalyst bed a recuperative effect due to heat exchange is each achieved by the combustion exhaust gases flowing off in the annular space formed by radiant tube and flame tube. Most of the combustion exhaust gases exiting via the lower opening of the flame tube are withdrawn via the annular space between flame tube and radiant tube and discharged to the outside. By means of the combustion exhaust gases, the combustion air introduced into the annular space formed by flame tube and gas lance, the fuel gas supplied via the gas lance, and the mixture of feed gas and steam flowing into the reaction space are heated. In the middle portion of the flame tube, a partial quantity of the combustion exhaust gases exiting via the lower opening of the flame tube is recirculated into the lower portion of the flame tube.

Figure 2:
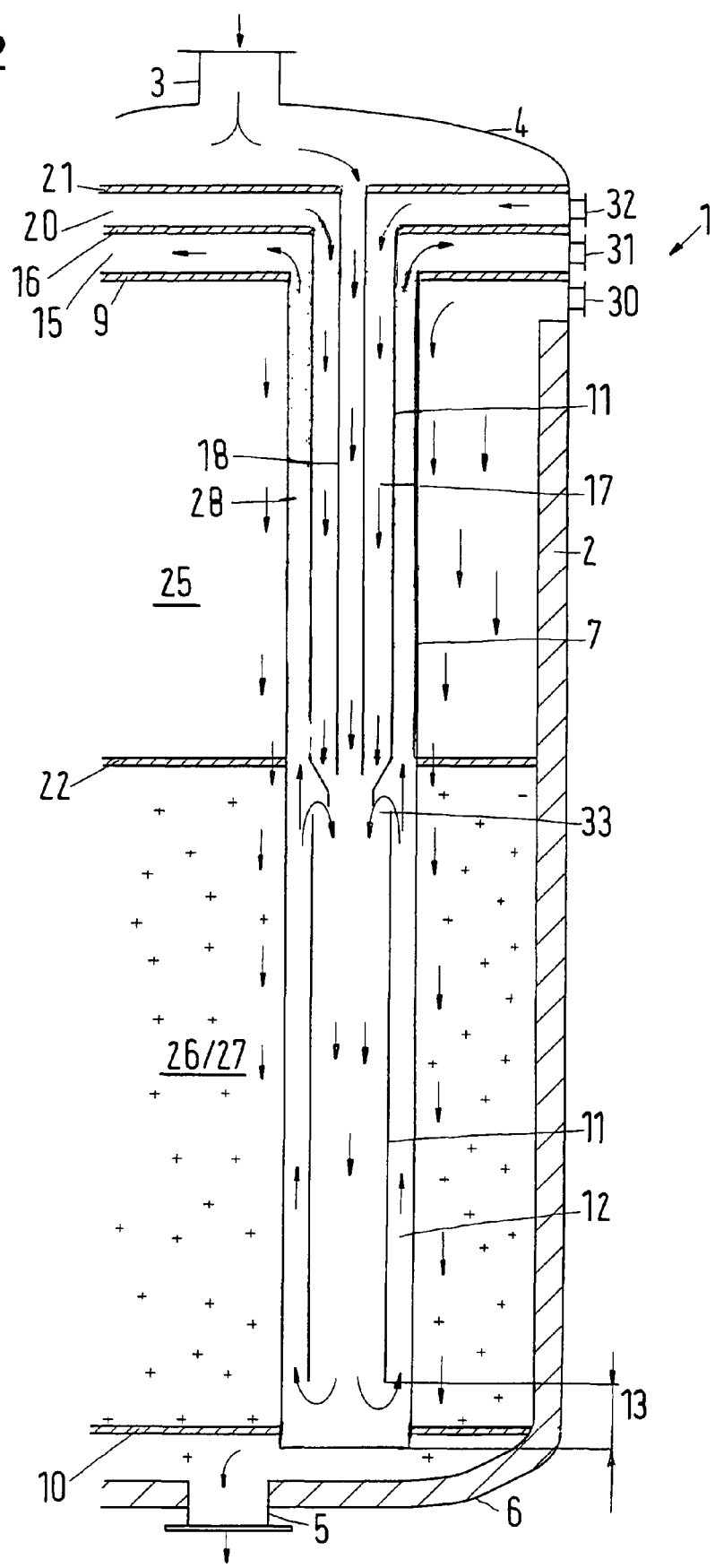
Figure 3:
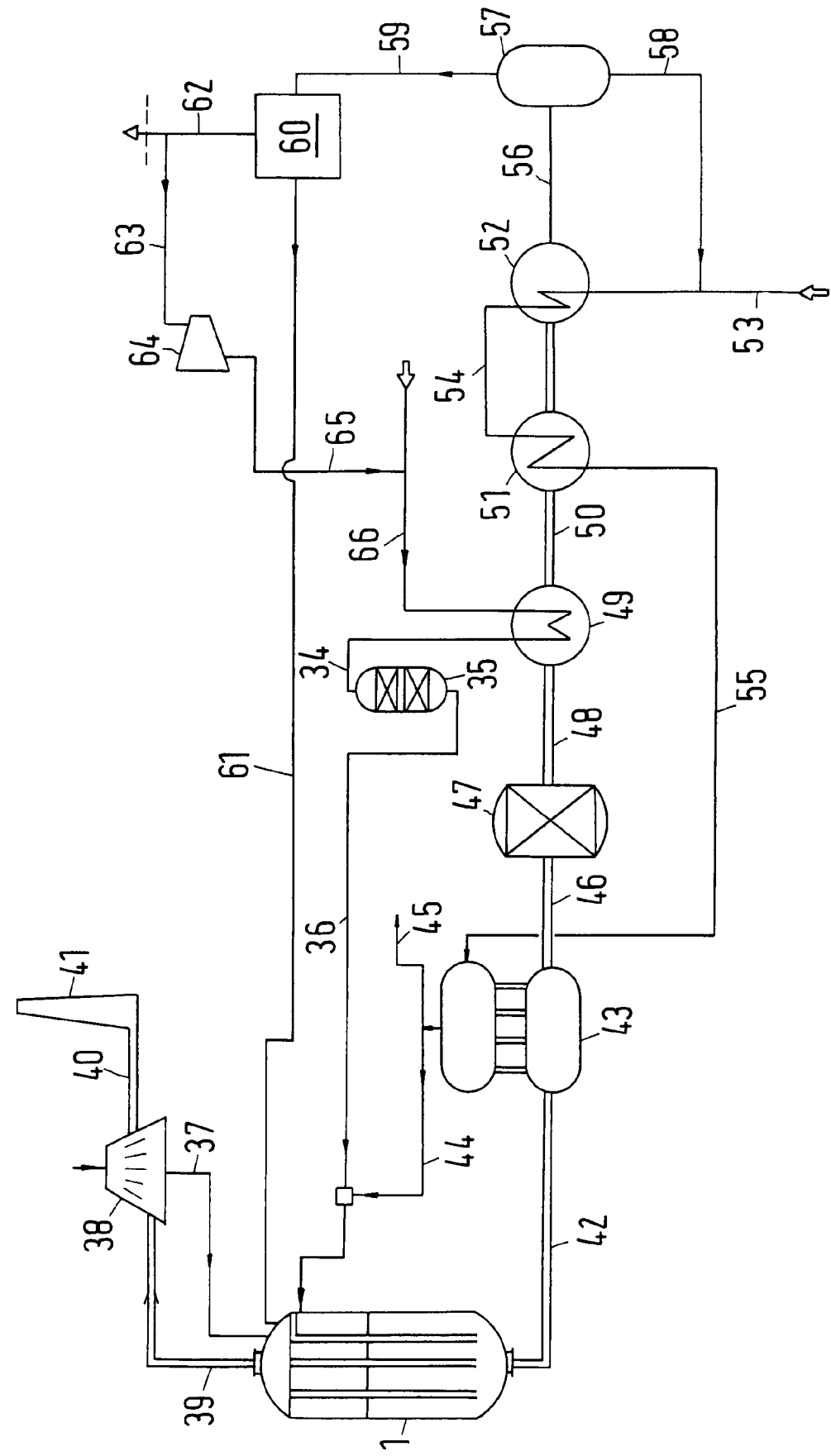

The apparatus in accordance with the invention is illustrated in the drawing by way of example and will be explained in detail below. In the drawing FIG. 1 shows a perspective representation of a reaction tank with cut-out tank wall and a radiant tube bundle inserted therein;

FIG. 2 shows a segment of a longitudinal section through a reaction tank and through a radiant tube; and FIG. 3 shows a process flow diagram for producing $H_2$ from hydrocarbon-containing feed gas by using the reaction tank designed in accordance with the invention.

In a vertically arranged, cylindrical reaction tank (1), which consists of the shell lined on the inside with a refractory layer (2), the convex lid (4) carrying the port (3) for supplying the fuel gas, and the convex bottom (6) including the port (5) for discharging the synthesis gas, a tube bundle is disposed, which is formed of a plurality of radiant tubes (7) extending axially parallel and closed at the bottom. The upper ends of the radiant tubes (7) are welded into apertures (8) of an upper tube sheet (9) firmly mounted on the lid, and the lower ends are guided through apertures (8') provided in a tube sheet (10) firmly mounted at the bottom. In the radiant tubes (7), a flame tube (11) open at the bottom is each concentrically inserted by forming an annular space (12), wherein a spacing (13) for the passage of the combustion exhaust gases from the flame tube (11) into the annular space (12) exists between the lower end of the flame tube (11) and the bottom of the radiant tube (7). The upper ends of the flame tubes (11) are welded into apertures (14) of a tube sheet (16) mounted above the tube sheet (9) for the radiant tubes (7) by forming a space (15). In the upper portion of the flame tubes (11), a gas lance (18) for supplying the fuel gases is each concentrically inserted by forming an annular space (17), wherein the upper ends of the gas lances (18) are welded into apertures (19) of a tube sheet (21) firmly mounted above the tube sheet (16) for fastening the flame tubes (11) by forming a space (20). Due to the arrangement of a tube sheet (22) fastened in the middle region, which includes apertures (23, 24) for the radiant tubes (7) and the passage of the mixture of feed gas and steam, the reaction space of the reaction tank (1) consists of an upper and a lower portion (25, 26). In the lower portion (26), the reaction space is filled with a catalyst bed (27) around the radiant tubes (7). Due to the annular space (28) each existing in the upper portion (25) of the reaction space between radiant tube (7) and flame tube (11), a recuperative effect is achieved as a result of a heat exchange with the combustion exhaust gases. The tube sheet (10) mounted at the bottom is provided with apertures (29) for discharging the synthesis gas from the reaction space. Via the port (30) mounted in the shell of the tank (1) directly below the tube sheet (9) on the side of the lid, feed gas is introduced into the reaction space (25, 26) in the space (15) existing between the tube sheet (9) and the tube sheet (16) disposed above the same. Via the annular space (12) formed by the flame tube (11) and the radiant tube (7), the combustion exhaust gases exiting from the lower opening of the flame tube (11) flow into the space existing between the tube sheet (9) and the tube sheet (16) located above the same, from which the same are discharged via a port (31) mounted in the shell of the tank (1). To the space (20) formed by the tube sheet (16) for fastening the upper ends of the flame tubes (11) and the tube sheet (21) disposed above the same for holding the upper ends of the gas lances (18), combustion air is supplied via a port (32) mounted in the shell of the tank (1), which via the annular space (17) existing between the flame tube (11) and the gas lance (18) is introduced into the lower portion of the flame tube (11) serving as combustion space. Directly below the tube sheet (22) fastened in the middle region of the reaction tank (1), the flame tube (11) includes apertures (33), through which part of the combustion exhaust gases flowing off via the annular space (12) between flame tube (11) and radiant tube (7) are recirculated into the lower portion of the flame tube (11).

EXAMPLE

Via conduit (34), 3140 m³/h of natural gas preheated to a temperature of 340° C. are charged to a desulfurization reactor (35) containing a hydrogenation bed, and upon desulfurization are supplied to the reaction space (25, 26) of the reaction tank (1) via conduit (36). Via conduit (37), the combustion air heated to a temperature of 300° C. in an air preheater (38) is supplied to the gas lances (18). The combustion exhaust gases having a temperature of 450° C. exit via the port (31) mounted in the shell of the reaction tank (1), are supplied to the air preheater (38) via conduit (37) and upon cooling to a temperature of 180° C. are passed to the chimney (41) via conduit (40). The synthesis gas having a temperature of 830° C., which exits via the port (5) in the tank bottom (6), flows through conduit (42) into a steam drum (43) in which the temperature of the synthesis gas is decreased to 340° C., and the steam formed is partly added to the natural gas stream in conduit (36) via conduit (44) and/or partly discharged from the process via conduit (45). The synthesis gas is charged to a converter (47) via conduit (46), and the CO is converted with the unconverted process steam to obtain $CO_2$ and $H_2$. Via conduit (48), the synthesis gas stream exiting from the converter (47) with a temperature of 415° C. is charged to the heat exchanger (49) traversed by the natural gas stream supplied. The synthesis gas stream having a temperature of 336° C., which flows out of the heat exchanger (49) via conduit (50) sequentially traverses the heat exchangers (51, 52), of which the heat exchanger (52) is supplied with fresh water to be preheated via conduit (53). The fresh water exiting from the heat exchanger (52) is supplied to the heat exchanger (51) via conduit (54) and discharged to the steam drum (43) via conduit (55). The gas stream exiting from the heat exchanger (52) and supplied to a separator (57) via conduit (56) is separated into a gas component and condensate. The condensate withdrawn via conduit (58) is added to the stream of fresh water in conduit (53), and the gas stream withdrawn is charged via conduit (61) to a pressure-swing adsorber (60), in which $H_2$ is separated from the remaining gas components. Via conduit (61), these gas components are introduced as fuel gas into the space (20) existing between the tube sheets (16, 21) of the reaction tank (1) and supplied to the gas lances (18). From the pressure-swing adsorber (60), 8300 Nm³/h of $H_2$ are discharged to the outside via conduit (62). From conduit (62), a small partial quantity of $H_2$ is discharged, supplied to a condenser (64) via conduit (63) and added to the natural gas flowing in conduit (66) via conduit (65).

The invention claimed is:

1. An apparatus for performing the method for producing gas containing $H_2$ and CO by catalytic conversion of hydrocarbons contained in a feed gas stream with steam, in that the feed gas heated to 300 to 400° C. and subsequently desulfurized is mixed with steam, the mixture of feed gas and steam is preheated by heat exchange at a pressure of 10 to 45 bar to a temperature of 300 to 700° C., and is subsequently heated over a catalyst by heat exchange at a pressure of 10 to 45 bar to a temperature of 650 to 950° C., wherein a catalyst bed contained in a vertical reaction tank is traversed by the mixture of feed gas and steam and is indirectly heated by thermal radiation and convection, wherein the vertical reaction tank includes a tube bundle comprising axially parallel, internally heatable radiant tubes closed at the bottom, in each radiant tube a flame tube concentrically is inserted by forming an annular space, said flame tube comprising apertures located in a middle section of the flame tube, and in each flame tube a gas lance concentrically is inserted by forming an annular space, and a reaction space to be traversed by the mixture of feed gas and steam is filled with a catalyst bed around the radiant tubes, wherein the reaction space of the reaction tank is filled with a catalyst bed up to a height of 30 to 75% of the overall height of the tube bundle.

2. The apparatus according to claim 1 wherein the reaction space of the reaction tank located above the catalyst bed is provided as a preheating space for the mixture of feed gas and steam.

3. The apparatus according to claim 1 wherein the reaction space of the reaction tank is filled with a catalyst bed up to a height of 40 to 60% of the overall height of the tube bundle.

* * * * *